United States Patent

[11] 3,550,890

| [72] | Inventor | George B. Kemp |
|---|---|---|
| | | 614 Monticello Ave., Dayton, Ohio 45404 |
| [21] | Appl. No. | 775,292 |
| [22] | Filed | Nov. 13, 1968 |
| [45] | Patented | Dec. 29, 1970 |

[54] SPECTACLE HOLDER
4 Claims, 2 Drawing Figs.

[52] U.S. Cl. ................................................. 248/205, 248/309
[51] Int. Cl. ..................................................... F16b 47/00
[50] Field of Search ........................................... 248/309, 300, 205

[56] References Cited
UNITED STATES PATENTS

| 2,202,242 | 5/1940 | Wortham ..................... | 248/300 |
| 2,817,487 | 12/1957 | Wantz .......................... | 248/309 |
| 2,884,220 | 4/1959 | Manley ......................... | 248/309 |
| 2,991,967 | 7/1961 | Bothos .......................... | 248/205 |

*Primary Examiner*—Marion Parsons, Jr.
*Attorney*—Jerome P. Bloom

ABSTRACT: A rack upon which a pair of spectacles may be placed for being temporarily supported while being removed from the eyes of a wearer, such as while a person is in a barber's chair and having a haircut or being shaved, the rack comprising a vertical panel securable to a wall, the panel having a pair of cushioned platforms upon which the lens of the spectacles are placed.

PATENTED DEC 29 1970

3,550,890

INVENTOR
GEORGE B. KEMP

SPECTACLE HOLDER

This invention generally relates to holders. More specifically, it relates to holders for supporting a pair of spectacles.

It is generally well known that upon occasion a wearer of eyeglasses is obliged to remove the same, as for example when a wearer sits in a barber's chair to have a haircut or a shave. At such time it may not be convenient where to place his glasses temporarily, particularly if the wearer's jacket has been removed prior to sitting in the barber's chair and a suitable pocket is not available in which to tuck the glasses.

Accordingly, it is the principle object of the present invention to provide a rack or holder whereupon eyeglasses may be temporarily supported in a safe place.

Another object of the present invention is to provide a spectacle holder having cushion means so as to prevent the spectacle leans from becoming scratched.

Yet a further object of the present invention is to provide a spectacle holder which includes a pocket for containing eyeglass cleaning tissue which may be conveniently dispensed for wiping the spectacle leans before replacing them upon the wearer.

Yet a further object of the present invention is to provide a spectacle holder which can be conveniently secured to any vertical wall, such as in a barber shop, dentist's office, or the like.

Other objects of the present invention are to provide a spectacle holder which is simple in design, inexpensive to manufacture, rugged in construction, easy to use and efficient in operation.

Figure 1:
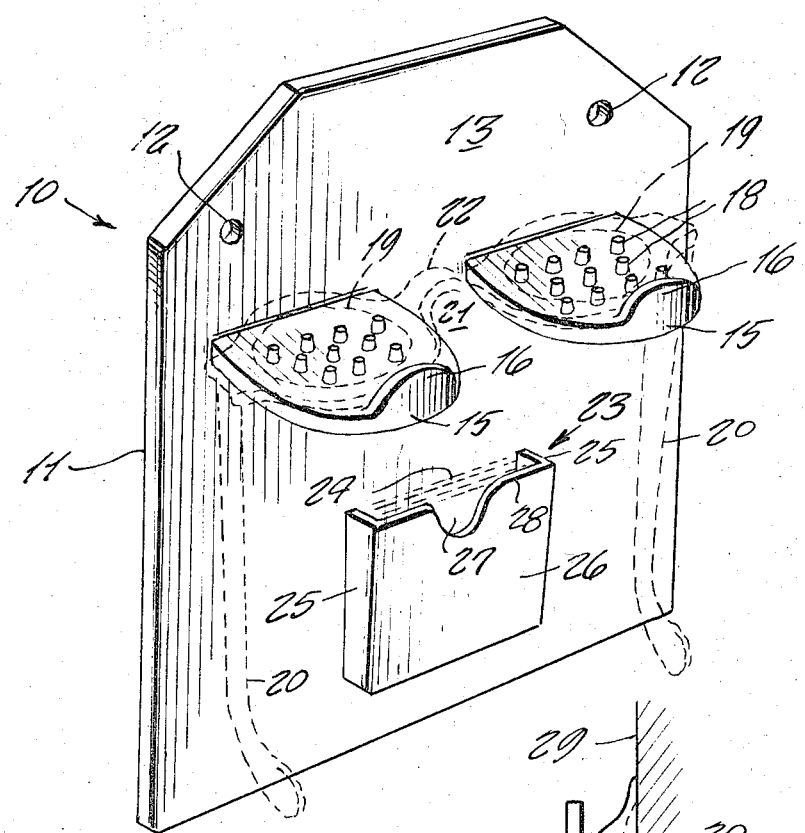
Figure 2:
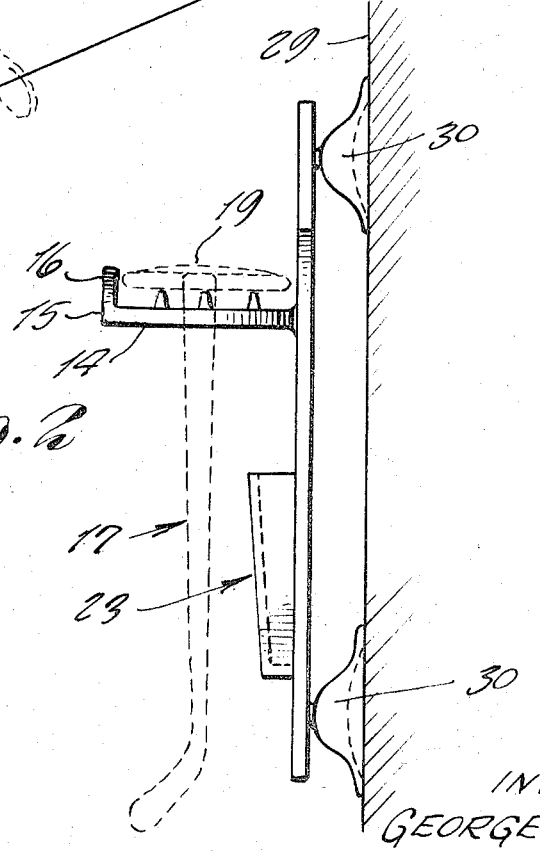

These and other objects will be readily evident upon a study of the following specification and the accompanying drawing wherein:

FIG. 1 is a perspective view of the present invention shown in operative use, and FIG. 2 is an end elevation view thereof.

Referring now to the drawing in detail, the reference numeral 10 represents a spectacle holder, according to the present invention, wherein there is a base panel 11 provided with a plurality of openings 12 therethrough for the purpose of mounting the base panel to a supporting vertical wall.

The front side 13 of the base panel 11 has a pair of forwardly extending platforms 14, both of which are at the same elevation and are spaced apart, as shown in FIG. 1 of the drawing. Each platform is provided at its forward end 15 with an upward extending tab 16 that serves as a restricting wall so as to prevent a pair of eye glasses 17 from slipping off the platforms.

Upon the upper side of the platforms, there are a plurality of upwardly extending projections 18 made of flexible rubber, each projection being upwardly tapered so that the upper terminal end thereof is readily flexible to move laterally in any direction so as to eliminate maximum sliding thereof respective to a lens 19 of the eyeglasses 17 which is positioned upon the projections.

As shown in FIG. 1 of the drawing, it is to be noted that in an operative use, the eyeglasses are positioned upon the spectacle holders so that each lens 19 is placed directly over the projections upon each of the platforms, the temple bars 20 of the eyeglasses depending downwardly adjacent the slides of the platforms. It will now be evident that the upward extending tabs 16 will prevent the eyeglasses from sliding off from the holder. The space 21 between the platforms provides clearance for any nose pressure pads such as are conventionally formed at the rear of the bridge 22 of the eyeglasses.

Upon the front side 13 of the base panel, a pocket 23 is also secured, the pocket forming a convenient dispenser for eyeglass cleaning tissue 24 contained there within. The pocket 23 includes opposite end walls 25 interconnected by a front wall 26 having a downward extending notch 27 along an upper edge 28 thereof so as to allow easy access by a person's fingers to the tissues 24 during removal thereof from the pocket. Thus, the customer of the barber shop or dental office can readily clean off his eyeglass lenses after removing the same from the spectacle holder.

In a modified form of the invention, shown in FIG. 8 of the drawing, the base panel 11 is secured to the vertical wall 29 by means of a plurality of rubber vacuum cups 30. This would be particularly suitable for use in business establishments where the wall 29 is made from a ceramic tile and will accordingly allow a vacuum to be developed by the attachment of a vacuum cup thereto.

While various changes may be made in the detailed construction, it is understood that such changes will be within the spirit and scope of the present invention, as is defined by the appended claims.

I claim:

1. A holder for spectacles and like formed objects including lens elements comprising a base for mounting to a wall or like surface, platform means connected to and projecting from said base, said platform means including upper surface portions from which project a plurality of elements at least the uppermost ends of which are flexible, the uppermost flexible ends of said elements being arranged in spaced relation and being grouped to provide that a plurality thereof will mutually mount and serve to balance thereon a lens portion of said spectacles or like object, the said uppermost flexible ends of said grouped elements being arranged to provide, by virtue of their flexible nature, means to resist the inadvertent displacement of the supported lens and the related spectacles or like object of which it is a part.

2. Apparatus as set forth in claim 1 characterized by there being two groups of said elements in spaced relation to provide that the uppermost flexible ends of the respective groups serve to balance thereon the respective lens elements of a spectacles or like object.

3. Apparatus as set forth in claim 1 characterized by said projecting elements being upwardly tapered, conformed of flexible material, and being arranged in a pair of laterally spaced groups, the tips of the projecting elements of the respective groups providing for a balance thereon of spaced lens elements, the uppermost tips of said projecting elements being relatively soft to provide a cushioning and protective, movement resisting, contact with the lens elements.

4. Apparatus as set forth in claim 3 characterized by said base being a platelike object one surface of which mounts in a flush abutting contact to a wall or like support surface and from the outer face of which projects said platform means in a laterally spaced relation, each mounting a group of said projecting elements adapted to balance thereon a lens element.